Dec. 15, 1925.
I. A. WEAVER
1,566,053
BRAKE TESTING APPLIANCE
Filed May 16, 1925
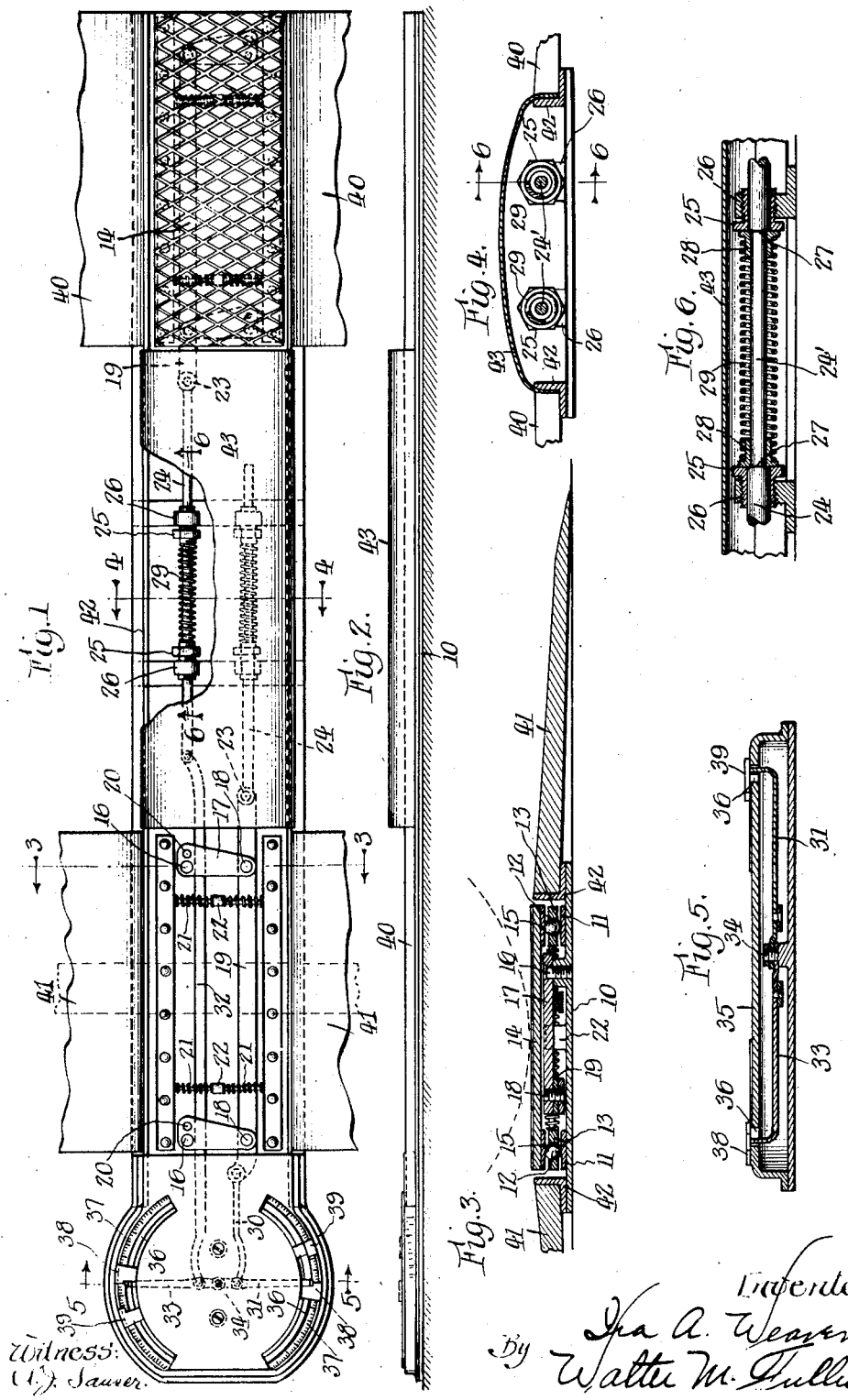

Patented Dec. 15, 1925.

1,566,053

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

BRAKE-TESTING APPLIANCE.

Application filed May 16, 1925. Serial No. 30,706.

*To all whom it may concern:*

Be it known that I, IRA A. WEAVER, a citizen of the United States, residing at Springfield, in the county of Sangamon and State of Illinois, have invented certain new and useful Improvements in Brake-Testing Appliances, of which the following is a specification.

This invention relates to the art of brake testing appliances, and has for its principal object to provide a simple, positive brake testing apparatus for accurately determining the actual brake resistance of an automobile.

Heretofore, so far as I am aware, the only means and manner of testing the pulling action of automobile wheel brakes has been to jack up the rear wheels of the car, have an operator sit in the front seat and apply his foot to the brake, and have another operator rotate or attempt to rotate the wheels of the car in order to judge their braking qualities. This involves more or less guess work, and is unreliable. It is usually found that one brake holds more than the other due to lack of proper care and adjustment. The result of one brake holding more than the other affects the tire wear, since more brake strain is applied to one tire than to the other and on wet or slippery pavement the brake which is holding more than the other will tend to cause the wheel to which it is applied to act as a pivot and cause the car to skid. Many bad accidents have been caused by this unequal condition of the two brakes.

Another object of the invention is to provide an apparatus wherein each brake-equipped wheel of the automobile may be simultaneously independently tested and its brake resistance determined. Another object is to provide an apparatus of the character mentioned which may conveniently be located on the floor of a garage and operated by simply driving the car over it. Another object is to provide in an apparatus of the character specified an improved registering mechanism whereby the actual pull in pounds of the tire, as the wheels roll or slide over the apparatus, may be registered and visible on an indicator. Still another object is to provide an appliance by which the testing of the brakes can be done on a car passing in either direction thereover.

Other objects and attendant advantages of the invention will be apparent to persons skilled in the art as the same becomes better understood by reference to the following detailed description, taken in connection with the accompanying drawing in which I have illustrated one practical and approved embodiment of the principle of the invention, and wherein—

Fig. 1 is a top plan view of my improved brake testing appliance, partly broken out and with the movable wheel engaged plate on one side removed to disclose underlying parts;

Fig. 2 is a front elevation of the appliance shown in Fig. 1, viewed from the lower side of the latter figure;

Fig. 3 is an enlarged cross-section on the line 3—3 of Fig. 1, showing the lower portion of an automobile tire thereon;

Fig. 4 is an enlarged cross-section on the line 4—4 of Fig. 1;

Fig. 5 is an enlarged cross-section through the registering dial on the line 5—5 of Fig. 1; and Fig. 6 is an enlarged vertical longitudinal section in the plane of the line 6—6 of Fig. 1.

Referring to the drawing, the appliance includes a pair of like devices over which the two rear wheels (or the two front wheels where the latter are equipped with brakes) simultaneously pass to register the brake resistance, and these two devices are both connected to a single registering indicator and are capable of functioning when the wheels pass thereover in either direction. As these two devices are structurally identical but merely reversed in respect to their actuating connections to the indicator, the same description will apply to both.

10 designates each of a pair of base plates that are conveniently located on the floor of the garage with their centers spaced substantially equal to the gauge of the automobile wheels. On the base plate 10 are a pair of parallel steel strips 11 on which are mounted steel balls 12 confined and spaced in ball retainers 13. Resting upon the two rows of balls 12 is a movable plate 14 equipped on its under side with steel strips 15 directly riding on the balls 12. The upper surface of the plate 14 is corrugated or ribbed, as shown at the right of Fig. 1, in such a manner as to present practically the same surface to the tire that the latter encounters under average road conditions.

On pivoted studs 16 mounted in the base 10 is mounted at its elbow a bell crank lever 17. The long arm of the bell crank 17 is pivoted at 18 to a bar 19 that lies between the base 10 and the top plate 14. The short arm of the bell crank 17 is pivoted at 20 to the under side of the plate 14. Light springs 21 abutting at their outer ends against the ball retainers 13 and at their inner ends against a central post 22 on the base plate 10 act to return the retainers 13 to normal central position when the plate 14 is freed from the load.

The bar 19 is pivotally connected at one end at 23 to a rod 24 that is slidably mounted in a pair of adjustable spring abutments 25 (Fig. 6) that, in turn, are threaded through a pair of spaced upstanding blocks 26 on that portion of the base 10 lying between the two wheel engaging members of the apparatus. The portion of the rod 24 lying between the inner faces of the abutments 25 is reduced as shown at 24', thereby producing annular shoulders 27 on the rod against which a pair of flanged bushings 28 are pressed by the thrust of an interposed coil spring 29; this spring 29 being the spring that resists the drag of the tire on the plate 14 transmitted through the elbow levers 17. The other end of one of the bars 19 is connected by a link 30 to a dial pointer 31; while the other bar 19 is connected, through the rod 24 and a longer link 32 to an opposite pointer 33 of the scale. As clearly shown in Fig. 5, the two pointers 31 and 33 are both pivoted on a pivot stud 34 at the center of the base of the dial. The dial base and pointers are protected by a stout cover 35 over which the wheels of the car might pass without injuring it, and this dial cover plate 35 is provided with slots 36 through which the upwardly turned ends of the pointers 33 and 31 project, and with arcuate scales 37 which may be graduated in pounds. Frictionally engaged in the slots 36 are blocks 38 and 39 lying on opposite sides of the pointer tips respectively and adapted to be moved by the latter during the registering operation.

Low inclined approach-ways 40 and 41 lead up to the opposite sides of the movable plates 14, their inner ends being preferably stepped on angle bars 42 secured to the opposite longitudinal edges of the base plate 10, which latter extends the full width of the apparatus.

The pull resisting springs 29 and their mountings are preferably covered and protected by a stout cover plate 43, the downwardly bent longitudinal edges of which may rest within the angle bars 42. This cover plate is sufficiently strong to withstand the weight of an automobile wheel passing thereover.

The manner in which the testing apparatus operates will be readily apparent from the foregoing description. As the rear wheels approach and ride onto the device, the brake is applied with sufficient force to arrest the movement of the car, and as the wheels roll or slide over the movable plates 14, the latter are dragged forwardly in the direction in which the car is moving for a slight distance, and, through the described connections to the indicator, the pointers thereof are swung independently in the same direction, one of the pointers being actuated by one of the wheels and the other by the other wheel. The extent of pull in pounds is thus measured, the friction blocks 38 or 39 marking the extreme swing of the pointers on the scale and thereby in effect recording the result which may be examined after the test has been made. Manifestly, the more perfect the braking action, the stronger will be the drag of the tire on the movable plate 14 and the higher will be the recorded brake resistance shown by the indicator; and, conversely, the weaker the braking resistance, the weaker will be the drag of the tire on the plate, and the lower will be the recorded brake resistance shown on the indicator. Since the two dial pointers are independently actuated by the two wheels, any difference in the resistance of the two brakes is clearly shown on the dial. Where the front wheels are equipped with brakes they can, manifestly, be tested in the same way. The testing can be accomplished by driving the car over the apparatus in either direction. When driving in one direction the pointers will actuate the friction blocks 38, and when driving in the opposite direction the indicator actuating impulse is reversed and the pointers will actuate the friction blocks 39.

To effect accurate comparative tests of the brake resistance of two wheels it is, of course, essential that the tension of the two springs 29 be exactly equal. If they are not equal, they can readily be adjusted to such equality by means of the adjustable abutments 25.

It will also be observed that the two scales 37 and their respective pointers 31 and 33 constitute two independent indicators for registering the brake resistances transmitted through the two movable plates 14. For economy of structure and space, however, the two indicators are preferably mounted in a single housing at one side of the apparatus, as herein shown.

The entire apparatus occupies so little height that it presents practically no obstruction to the passage of the car into and out of the garage, and the parts are thoroughly protected against injury by the passage of the car thereover.

I have herein shown and described one simple and practical physical embodiment of the principle of my invention; but it is manifest that numerous changes in the details of structure and arrangement may be resorted to without departing from the principle of the invention or sacrificing any of the advantages inhering therein. Hence, I do not limit the invention to the specific apparatus disclosed but reserve all such variations and modifications as fall within the spirit and purview of the appended claims.

I claim—

1. In a brake testing appliance for vehicles, the combination of a plate adapted to be overrun by a wheel and shifted by the drag of said wheel thereon, an indicator, connections from said plate to said indicator transmitting movement of the former to the latter, and a spring opposing the wheel-actuated movement of said plate.

2. In a brake testing appliance for vehicles, the combination of a plate adapted to be overrun by a wheel and shifted edgewise by the drag of said wheel thereon, anti-friction supports for said plate, an indicator, connections from said plate to said indicator transmitting movement of the former to the latter, and a spring opposing the wheel-actuated movement of said plate.

3. In a brake testing appliance for vehicles, the combination of a plate adapted to be overrun by a wheel and shifted edgewise by the drag of said wheel thereon, anti-friction supports, including balls and ball retainers, for said plate, an indicator, connections from said plate to said indicator transmitting movement of the former to the latter, a spring opposing the wheel actuated movement of said plate, and light springs causing said ball retainers to accompany the return movement of said plate.

4. In a brake testing appliance for vehicles, the combination of a stationary base plate, anti-friction bearings on said base plate, an upper plate supported on said bearings adapted to be overrun by a wheel and shifted edgewise by the drag of said wheel thereon, an indicator including a scale and a pointer movable thereover, a lever pivoted on said base plate and having one arm thereof pivoted to said upper plate, a bar between said base plate and upper plate pivoted to the other arm of said lever, a link connecting said bar to the pointer of said indicator, and a spring opposing the plate-actuated movement of said lever, bar and link.

5. In a brake testing appliance for vehicles, the combination of a stationary base plate, antifriction bearings on said base plate, an upper plate supported on said bearings adapted to be overrun by a wheel and shifted edgewise by the drag of said wheel thereon, an indicator including a scale and a pointer movable thereover, a pair of bell crank levers pivoted at their elbows on said base plate and each having one arm thereof pivoted to said upper plate, a bar between said base plate and upper plate pivoted to the other arms of said levers, a link connecting said bar to the pointer of said indicator, and a spring connected to said bar and opposing the lever-actuated movement of the latter.

6. In a brake testing appliance for vehicles, the combination of a plate adapted to be overrun by a wheel and shifted by the drag of said wheel thereon in either of two opposite directions, an indicator, connections from said plate to said indicator transmitting movement of the former to the latter, and a spring opposing the wheel-actuated movement of said plate in both of said opposite directions.

7. In a brake testing appliance for vehicles, the combination of a fixed base plate, anti-friction bearings on said base plate, an upper plate supported on said bearings adapted to be overrun by a wheel and shifted edgewise by the drag of said wheel thereon in either of two opposite directions, an indicator including a scale and a pointer movable thereover, a lever pivoted on said base plate and having one arm thereof pivoted to said upper plate, an endwise movable bar between said base plate and upper plate pivoted to the other arm of said lever, a link connecting said bar to the pointer of said indicator, and a resistance spring connected to said bar and opposing endwise movement thereof in both directions.

8. In an appliance for effecting comparative tests of vehicle wheel brakes, the combination of a plurality of plates adapted to be simultaneously overrun by a corresponding plurality of wheels and shifted edgewise by the drag of said wheels thereon, a corresponding plurality of indicators, independent connections from said plates to said indicators transmitting the movements of the former to the latter, and independent springs respectively opposing the wheel-actuated movements of said plates.

9. In an appliance for effecting comparative tests of vehicle wheel brakes, the combination of a plurality of plates adapted to be simultaneously overrun by a corresponding plurality of wheels and shifted edgewise by the drag of said wheels thereon, a corresponding plurality of indicators, independent connections from said plates to said indicators transmitting the movements of the former to the latter, springs respectively opposing the wheel-actuated movements of said plates, and means for equalizing the tensions of said springs.

10. In an appliance for effecting comparative tests of vehicle wheel brakes, the combination of a fixed base plate, a plurality of upper plates supported by anti-friction bearings on and movable crosswise of the end portions of said base plate, said upper plates adapted to be simultaneously overrun by a corresponding plurality of wheels and shifted edgewise by the drag of said wheels thereon, a corresponding plurality of indicators located opposite one end of said base plate, independent connections from said upper plates to said indicators transmitting the movements of the former to the latter, resistance springs mounted on said base plate between said upper plates respectively opposing the wheel-actuated movements of said upper plates, and a cover plate mounted on said base plate between adjacent edges of said movable plates housing and protecting said springs.

In witness whereof I have hereunto set my hand and seal.

IRA A. WEAVER. [L. S.]